(12) United States Patent
Vardion (10) Patent No.: US 6,485,643 B2
(45) Date of Patent: Nov. 26, 2002

(54) MODULAR BASE FOR A FILTER CARTRIDGE AND METHOD OF MANUFACTURING THEREFOR

(75) Inventor: Stephen J. Vardion, Glastonbury, CT (US)

(73) Assignee: Stanadyne Corporation, Windsor, CT (US)

( * ) Notice: Subject to any disclaimer, the term of this patent is extended or adjusted under 35 U.S.C. 154(b) by 13 days.

(21) Appl. No.: 09/805,757

(22) Filed: Mar. 13, 2001

(65) Prior Publication Data

US 2002/0130072 A1 Sep. 19, 2002

(51) Int. Cl.[7] .............................................. B01D 35/30
(52) U.S. Cl. ....................... 210/232; 210/249; 210/444; 29/525.01; 29/527.1; 29/902; 264/DIG. 48
(58) Field of Search ................................. 210/232, 249, 210/444; 29/525.01, 527.1, 902; 264/DIG. 48

(56) References Cited

U.S. PATENT DOCUMENTS

| | | | |
|---|---|---|---|
| 2,418,777 A | * | 4/1947 | Le Clair |
| 4,904,382 A | * | 2/1990 | Thomsen |
| 5,484,527 A | * | 1/1996 | Janik et al. |
| 5,614,091 A | * | 3/1997 | Janik et al. |
| 5,826,854 A | * | 10/1998 | Janvrin |
| 5,914,037 A | * | 6/1999 | Yen |

* cited by examiner

Primary Examiner—Thomas M. Lithgow
(74) Attorney, Agent, or Firm—Alix, Yale & Ristas, LLP (57) ABSTRACT

A modular base for a filter assembly includes a header portion defining a cavity for receiving a filter cartridge and a communication module defining fluid pathways to and from the base. Brackets extend from the header portion and include slots. Yokes extend from the communication module to complement the slots. The brackets and received yokes together define pathways into which generally tubular compression limiters are inserted. The compression limiters serve dual functions by retaining the communication module to the header portion and reinforcing the brackets. A sealing grommet disposed between the header portion and communication module enhances the sealed integrity of the base.

12 Claims, 9 Drawing Sheets

MODULAR BASE FOR A FILTER CARTRIDGE AND METHOD OF MANUFACTURING THEREFOR

FIELD OF THE INVENTION

This invention relates generally to fuel filter systems for internal combustion engines. More particularly, this invention relates to a modular base for retaining the filter cartridge and a method for manufacturing the modular base.

BACKGROUND OF THE INVENTION

In fuel filter systems to which the invention relates, such as those disclosed in U.S. Pat. Nos. 5,203,994, 5,302,284 and 5,766,463, a disposable filter cartridge is mounted to a base in such a way that it can be relatively easily removed at pre-established intervals for replacement purposes. The base typically has a pair of coaxial central conduits that provide the fuel inlet and outlet to the filter cartridge. The cartridge may contain a single or multiple stage filter configuration for filtering the fuel. In numerous embodiments the replaceable filter cartridge is suspended below the base, but other orientations are commonly employed. The base is mounted to the vehicle in any of a number of locations depending on the particular application and spatial constraints. The base typically also includes inlet and outlet connectors that may be in the form of posts or other structures which mount fittings to connect input and output lines to the base.

The fuel filter is most commonly mounted in the engine compartment and may be subject to a number of dimensional and headroom constraints depending on the particular vehicle for which the filter assembly is employed. The placement and angular orientation of the inlet and outlet connectors or fittings are often critical for meeting the headroom and optimum system constraints of the application. A bracket typically projects from the base to provide a location for use of mounting hardware to fix the base to the vehicle. The base/vehicle attachment must be able to withstand the vibration and physical shock present in a vehicular environment.

Vehicle manufacturers provide a multitude of custom vehicle configurations to meet consumer demand. Frequently, within a particular base vehicle there are multiple engine types and accessory packages. Each engine type and/or accessory package may require an alternative fuel filtration configuration. Diesel fuel systems may be equipped with pre-heaters and hand primers on the filter base. As a result, there has been a proliferation in the number of filter base configurations necessary to meet the demands of vehicle manufacturers.

Filter bases have typically been cast aluminum or molded plastic units. The molds required to produce alternative configurations are complex and therefore expensive to produce. Each mold frequently includes unique fuel inlet and outlet configurations as well as alternative bracket and filter retention arrangements. In some instances the total quantity of bases having a particular configuration may be quite limited. These factors place a premium on the ability of component manufacturers to produce filter bases configured to vehicle manufacturer specifications quickly and efficiently.

U. S. patent application Ser. No. 60/183,194, assigned to the assignee of the present invention, is directed to a multi-configurable filter base module and manufacturing method therefor. In accordance with that invention, a filter base is manufactured from component parts that are molded separately and assembled to form alternative base configurations as required. A modular configuration enables the component manufacturer to modify a particular aspect of the filter base, such as the bracket or inlet/outlet configuration without producing an entirely new mold. Dramatic improvements in cost-efficiency are possible with a modular base. Certain portions of a plastic base require reinforcement to withstand the stresses placed on the base in the vehicular environment. The mounting structure is particularly vulnerable to stresses from both the mounting hardware and environmental stress. The multi-configurable base module uses split tubular steel sleeve reinforcements within the brackets to enhance the structural integrity of the brackets and their fastening to the engine compartment.

A modular configuration places a premium on the efficiency and reliability of the assembly process to capture potential cost savings. The assembly process preferably requires a minimum of labor intensive steps to produce a fluid-tight filter base of high structural integrity. Assembly using solvent-based or ultrasonic welding can be labor intensive and may be subject to potential inconsistency in the resulting products. Mechanical, i.e., hardware connections between the component parts, while more reliable, can be expensive to implement in terms of time and labor.

SUMMARY OF THE INVENTION

Briefly stated, a preferred embodiment of the invention is a modular base for a filter cartridge in which the metal parts necessary for reinforcement of the mounting structure are utilized to form a robust mechanical connection between primary components of the base.

More particularly, a preferred embodiment of the filter base includes a header portion and a communication module. The header portion includes integrally molded mounting bracket structures and defines a cavity for reception of a filter cartridge. An integral retainer as described in U.S. patent application Ser. Nos. 09/356,578 and 09/356,594, assigned to the assignee of the present invention, extends from the header portion. The retaining ring preferably includes a series of axial slots and associated retaining channels. An associated filter cartridge includes a complementary arrangement of radially projecting tabs. The filter cartridge is inserted into the header portion and rotated to engage the tabs in the retaining channels.

The communication module preferably includes structures for providing fluid communication to and from the filter base and attached filter cartridge. These structures include inlet and outlet connectors and at least one conduit projecting into the cavity defined by the header portion. The communication module is configured to be received in the header portion and joined thereto to form a base for a filter cartridge.

The junction between the header portion and communication module includes a mechanical component and a fluid sealing component. An O-ring seal compressed between complementary structures projecting from the header portion and the communication module preferably provides the fluid-sealing component. The O-ring seal is compressed primarily in a radial direction. A yoke on the communication module complements a slot in a pair of header portion mounting brackets to form two cylindrical pathways through the base. A tubular steel compression limiter is inserted through each pathway. Each compression limiter is preferably in the form of a generally cylindrical split pin. The outside surface of each compression limiter is frictionally retained in the mounting bracket and engaged with the associated yoke to exert an axial retention force between the communication module and the header portion.

Since the step of inserting the compression limiter is a necessary step in the manufacturing process, using the compression limiter to join the communication module and header portion does not add an assembly step. The complementary yoke and slot configurations assure proper alignment of the components. No solvents, adhesives or welding are required. The compression limiter is a high strength steel component and therefore provides an extremely reliable connection.

An object of the present invention is to provide a new and improved multi-function filter base which may be assembled in an efficient and low-cost manufacturing process.

Another object of the present invention is to provide a new and improved filter base in which the primary modular components are held together by a necessary reinforcing component.

Another object of the present invention is to provide a new and improved method for manufacturing a filter base in which the primary modular components are attached during an otherwise required assembly step without the use of a dedicated attachment component.

These and other objects, features and advantages of the invention will become readily apparent to those skilled in the art upon reading the description of the preferred embodiments, in conjunction with the attached drawings.

DETAILED DESCRIPTION OF THE PREFERRED EMBODIMENTS

With reference to the drawings wherein like numerals represent like parts throughout the figures, a modular filter base in accordance with the present invention is generally designated by the numeral 10. The base 10 is preferably employed to provide a mounting location for a filter cartridge. Together, the base 10 and cartridge form a filter assembly for the removal of particulates and/or water from the fuel supply of an internal combustion engine. The illustrated preferred embodiments of a filter base employ components molded from 33% glass filled nylon. The phrase "integral" as used in this application will be understood by those of skill in the art to mean that the structures referred to as "integral" are produced from a single mold and connected to form a unitary major component. The material used to produce the base components is not critical to the invention. Other fabrication techniques and/or materials may be employed without departing from the spirit and scope of the present invention.

Figure 1:
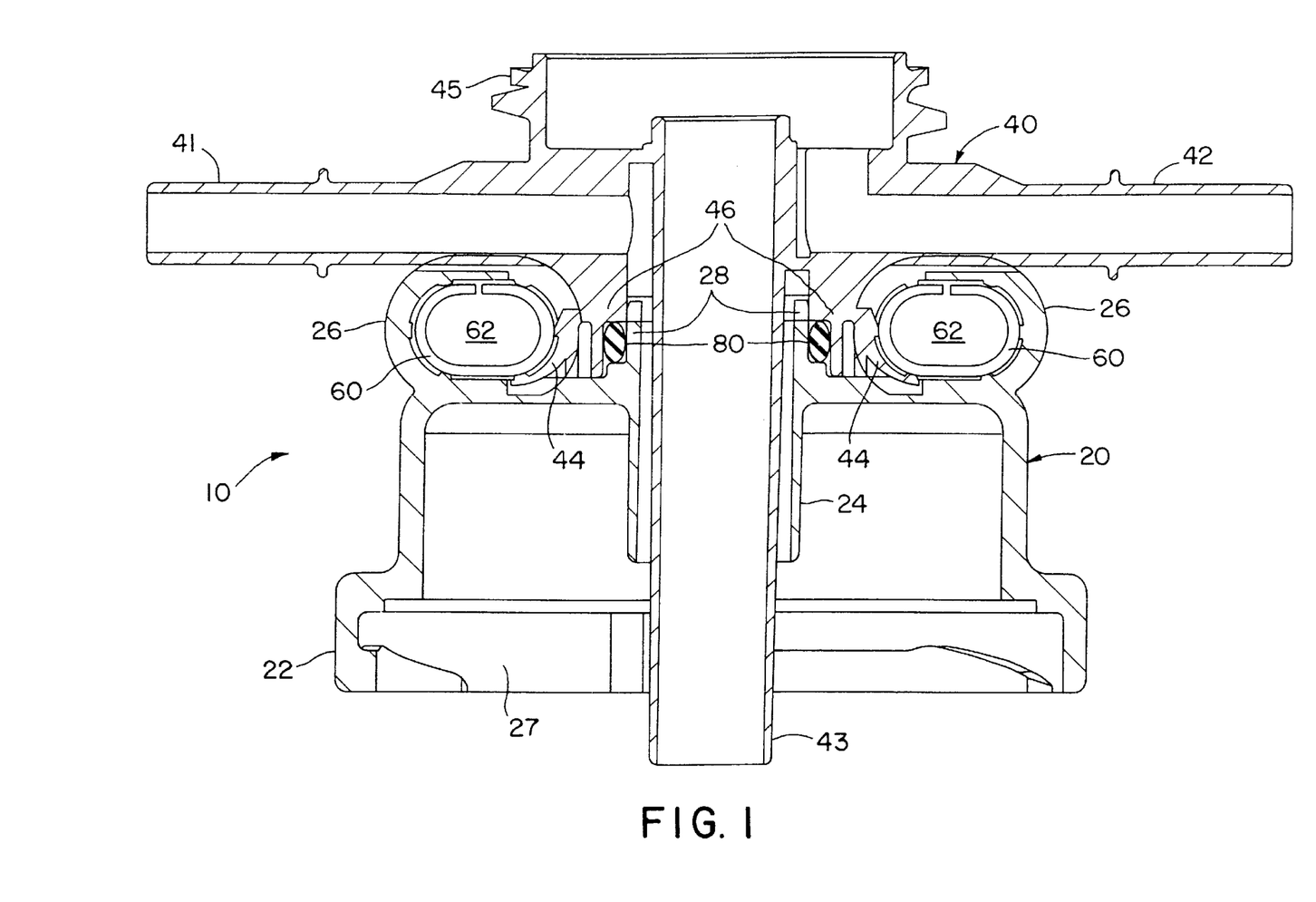
FIG. 1 is a sectional view through a modular base for a filter cartridge in accordance with the present invention.
Figure 2:
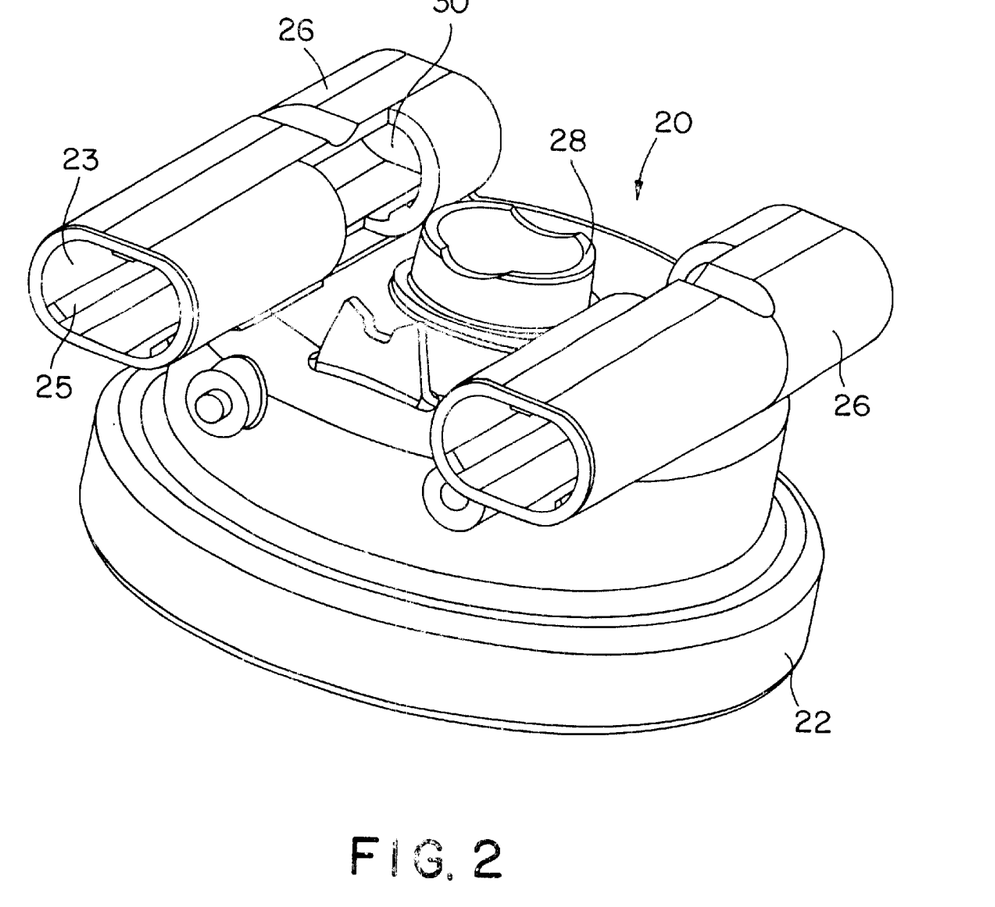
FIG. 2 is a top perspective view of the header portion of the modular base of FIG. 1.
Figure 3:
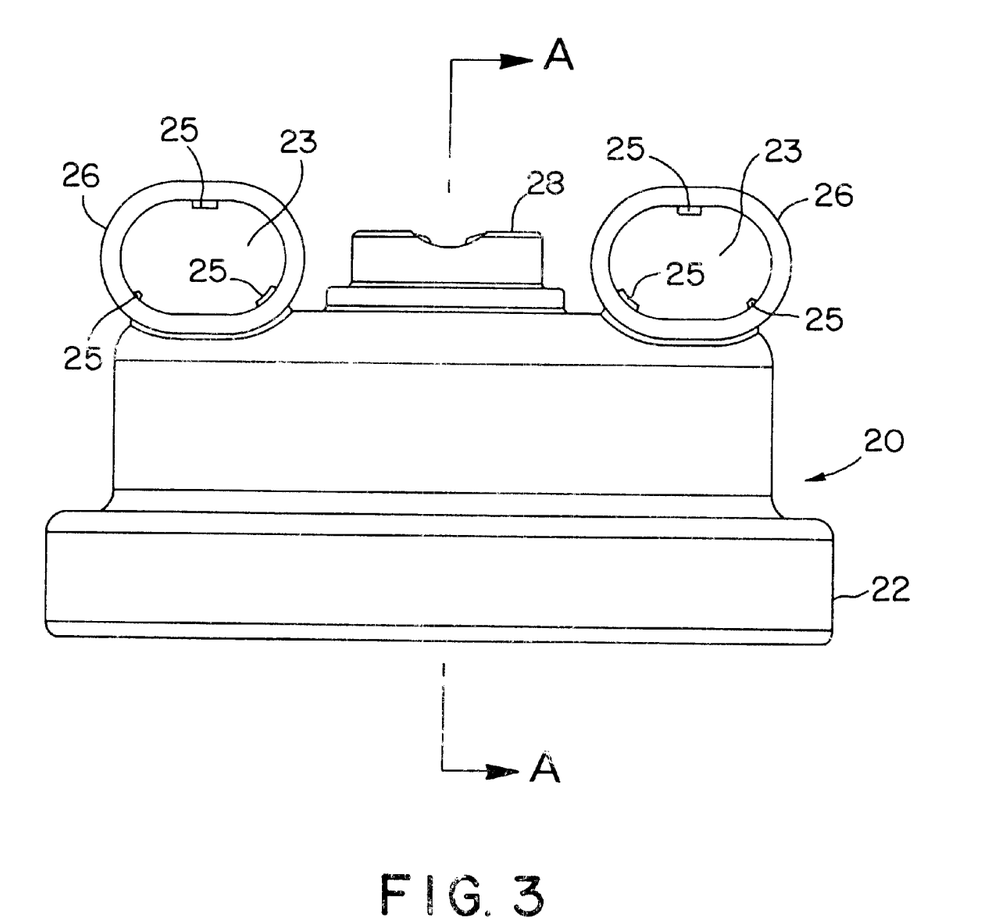
FIG. 3 is a side plan view of the header portion of FIG. 2.
Figure 4:
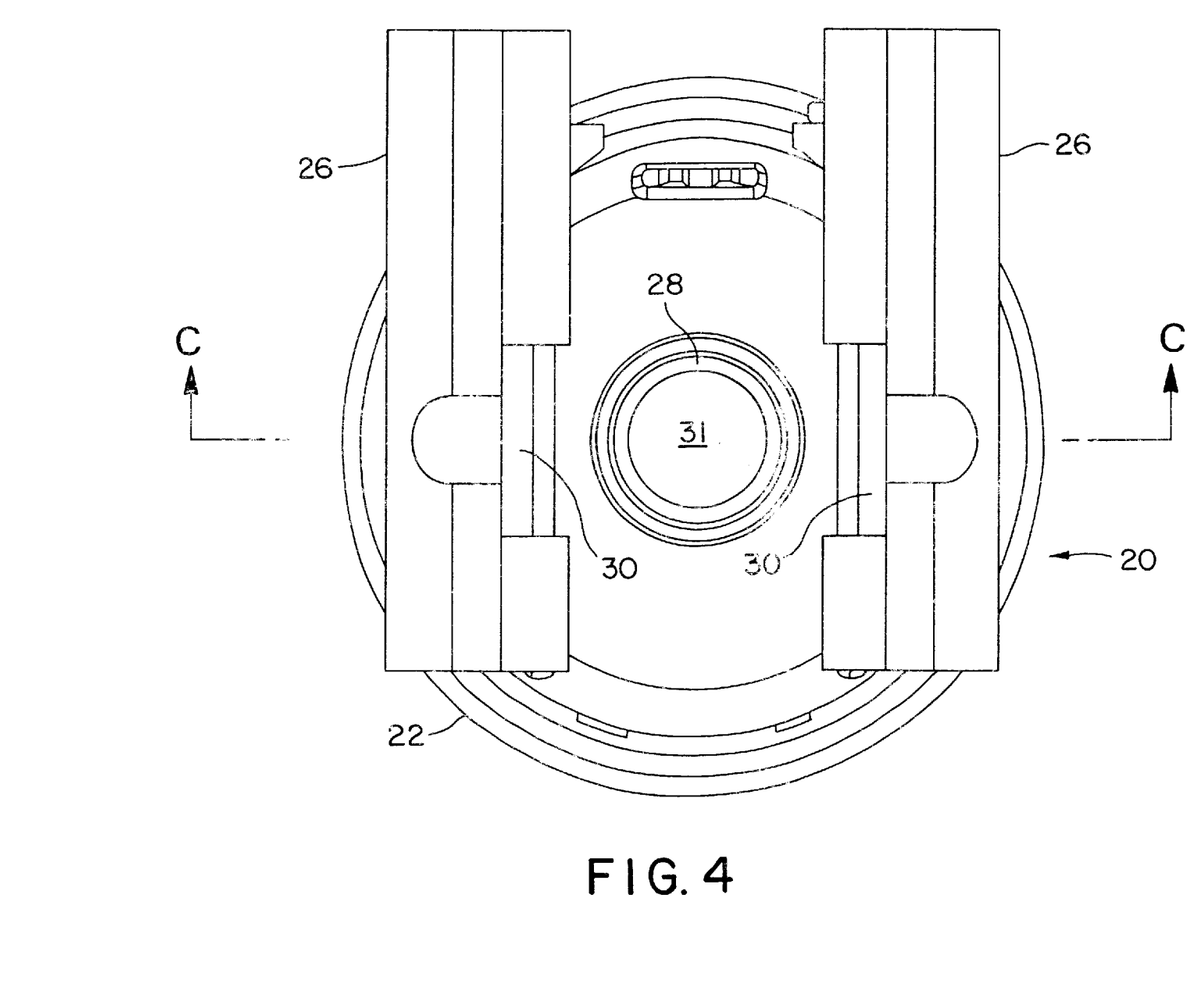
FIG. 4 is a top plan view of the header portion of FIG. 2.
Figure 5:
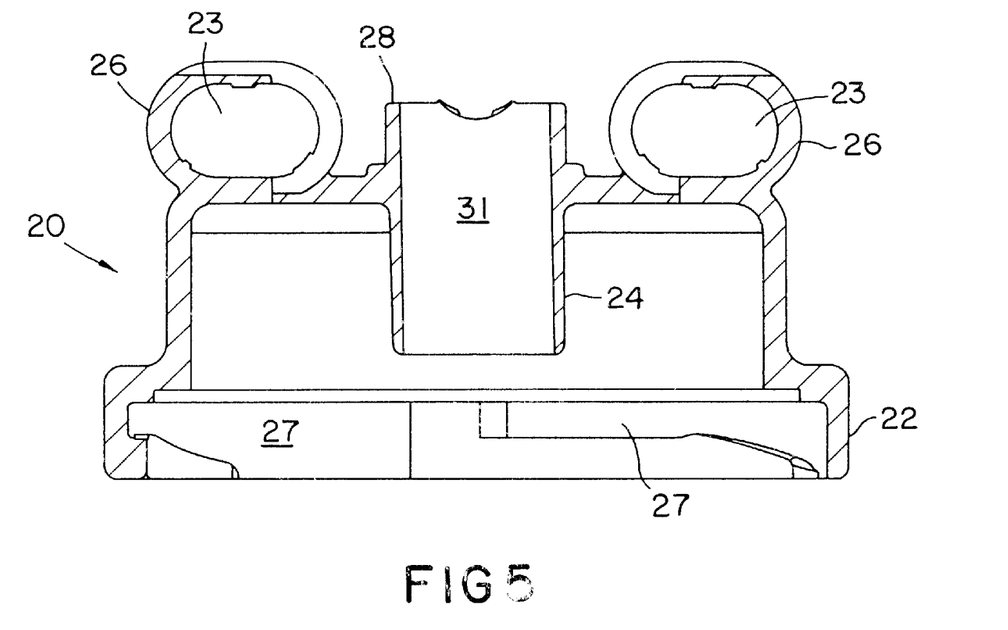
FIG. 5 is a sectional view through the header portion of FIG. 4, taken along line C—C thereof.
Figure 6:
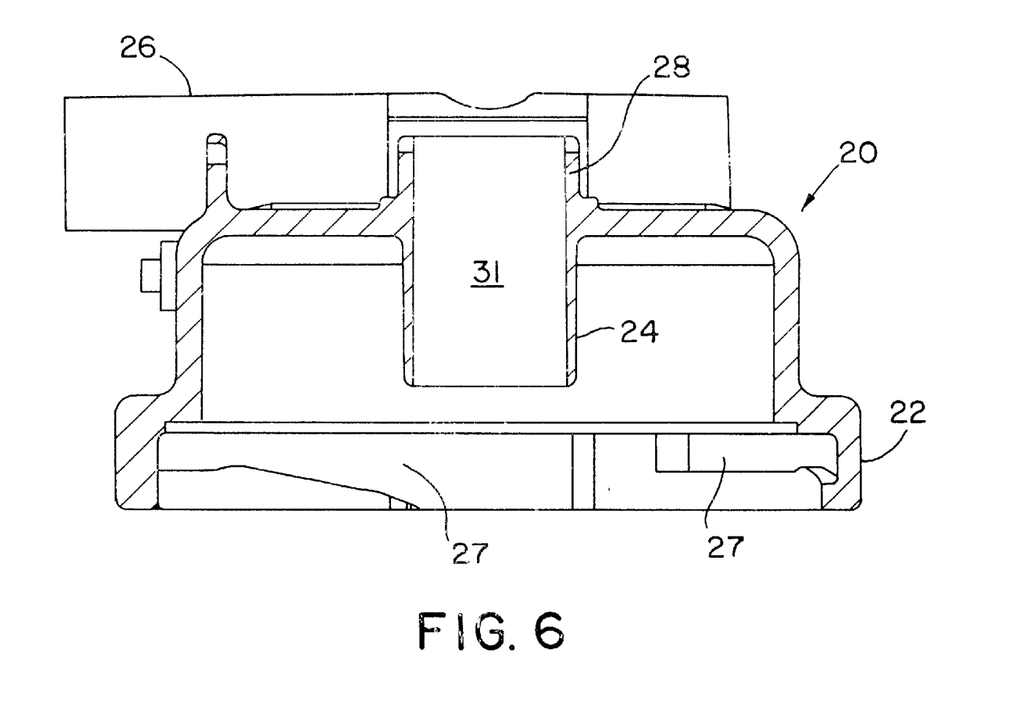
FIG. 6 is a sectional view through the header portion of FIG. 3, taken along line A—A thereof.

FIGS. 1–8 illustrate a first preferred embodiment of a base 10 in accordance with the present invention. With reference to FIG. 1, the base 10 is constructed from two primary molded components; a header portion 20 and a communication module 40. The header portion 20 and communication module 40 are each molded components having integrally molded structures that serve various functions.

FIGS. 1–6 illustrate the configuration of a first preferred embodiment of a header portion 20. The header portion 20 defines a receiving cavity and includes a retainer 22 for retention of a cartridge to the base. The retainer 22 defines a series of angularly spaced retaining channels 27 that receive and retain tabs projecting from a filter cartridge (best seen in FIGS. 5 and 6). The header portion 20 further includes a pair of mounting brackets 26 that define generally tubular passages 23 for reception of hollow steel reinforcements that will be further discussed below. Each mounting bracket includes a slot 30, best illustrated in FIGS. 2 and 4. Angularly spaced ribs 25 extend along the passages. An outlet conduit 24 extends into the receiving cavity to direct the flow of outgoing fluid and interact with sealing structures in a received filter cartridge (not shown). A lip 28 extends axially away from the outlet conduit 24 to provide surfaces for aligning and sealing the header portion 20 with the communication module 40. Together, the outlet conduit 24 and lip 28 define an axial opening 31 through which fluid will enter and exit the base 10.

Figure 7:
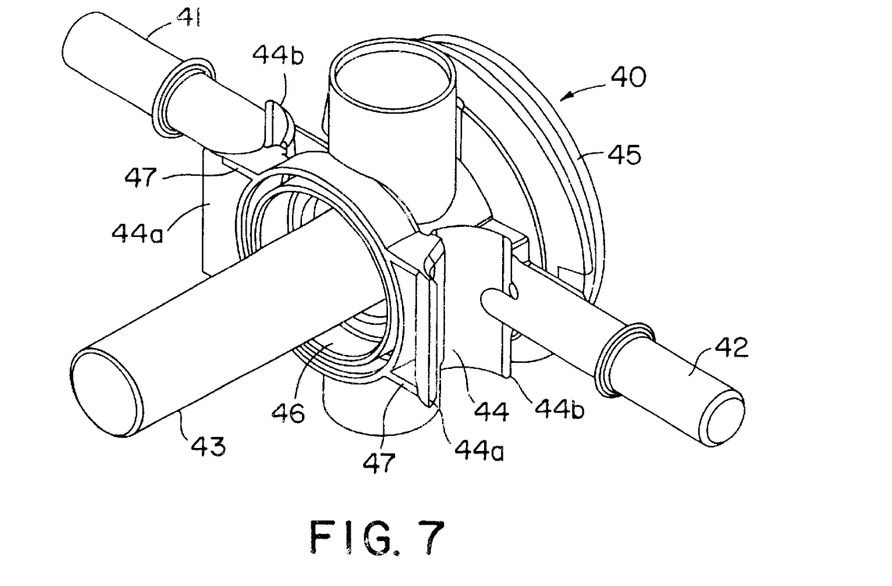
FIG. 7 is a bottom perspective view of the communication module of the modular base of FIG. 1.
Figure 8:
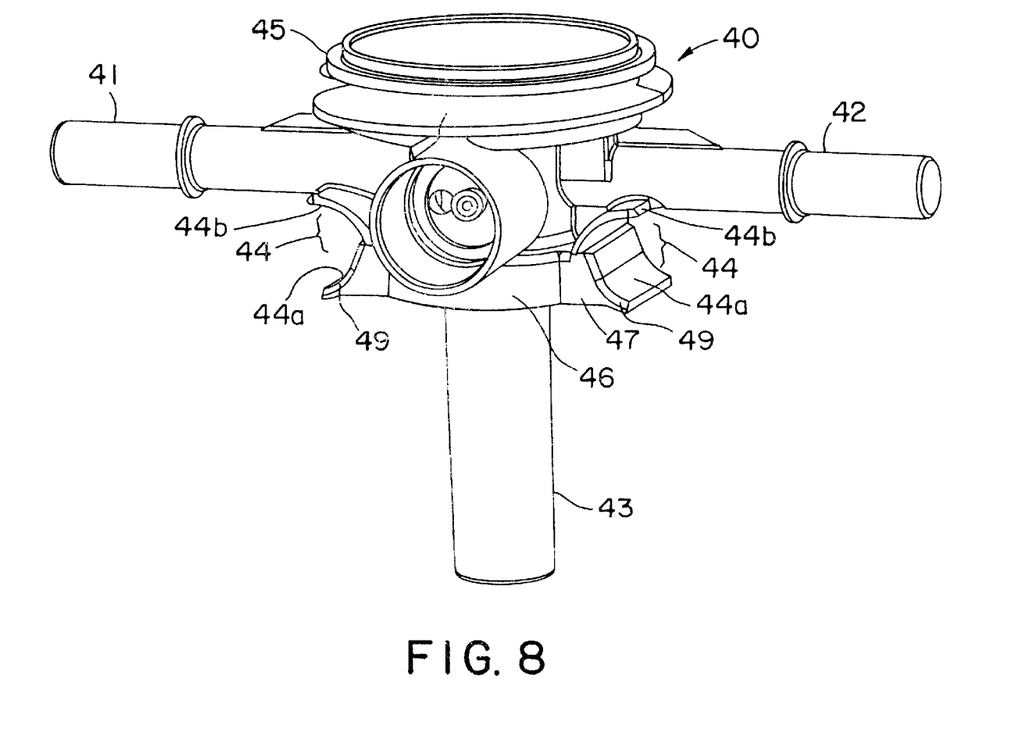
FIG. 8 is an overhead side perspective view of the communication module of FIG. 7.
Figure 9:
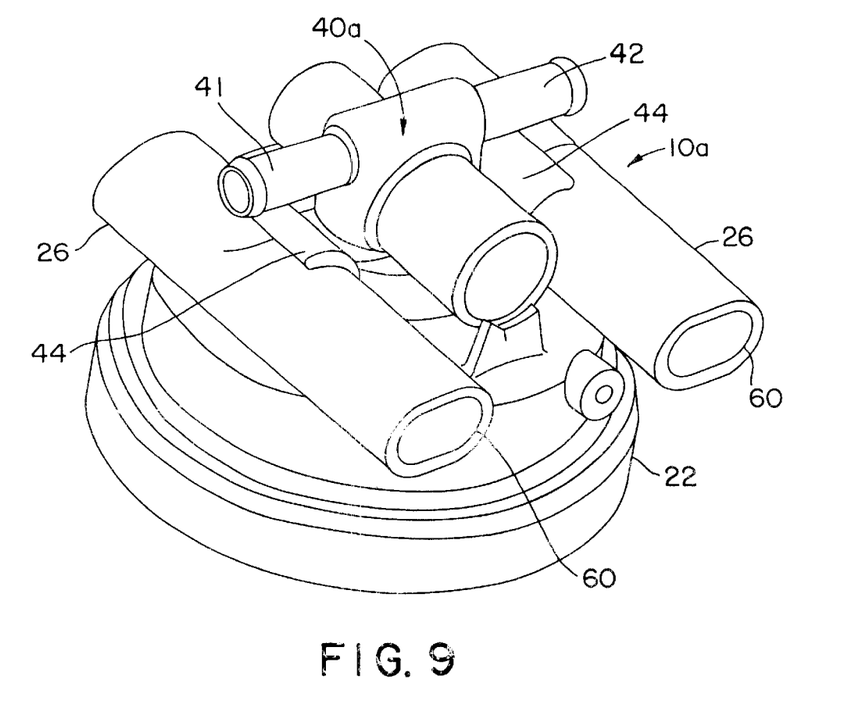
FIG. 9 is a top perspective view of an alternative embodiment of a modular base in accordance with the present invention.

A first preferred embodiment of communication module 40 is best described with reference to FIGS. 1, 7 and 8. The communication module 40 is equipped with a threaded collar 45 surrounding an opening configured to receive a hand primer (not shown). An inlet connector 42 and an outlet connector 41 provide locations for fixing fluid input and output lines to the base 10. An inlet conduit 43, in fluid communication with the inlet connector 42 and hand primer location, extends into the receiving cavity to direct the flow of incoming fluid and interact with sealing structures in a filter cartridge (not shown). A sealing collar 46 projects toward the header portion 20 to provide sealing and alignment surfaces interactive with the lip 28. A sealing grommet 80 is compressed primarily in a radial direction between surfaces of the sealing collar 46 and the lip 28 to fluidly seal the communication module 40 to the header portion 20. Radially opposed yokes 44 extend from the communication module 40.

The yokes 44 are complementary to the slots 30 in the brackets 26 of the header portion 20. Each yoke 44 includes a force-receiving portion 44a and a cover portion 44b. Each force-receiving portion 44a of the yoke 44 is configured to pass through a slot 30. Webs of plastic material 47 provide added strength and rigidity to the force-receiving portions 44a. Beveled edges 49 facilitate alignment of the yoke during installation of the compression limiters 60. The cover portions 44b of the yoke are configured to extend over the edges of the slots 30 and provide a finished appearance to the assembled base. This preferred configuration provides strength and rigidity where needed while providing an efficient use of material.

Assembly begins with the positioning of a sealing grommet 80 around the lip 28 of the header portion 20. The communication module 40 is then axially inserted into the header portion 20 where the sealing collar 46 surrounds and radially compresses the grommet 80. The complementary configuration of the yokes 44 and slots 30, sealing collar 46 and lip 28 assure proper relative positioning of the components. With the communication module 40 fully received in the header portion 20, the yokes 44 align with the passages 23 defined by the brackets 26 (best seen in FIG. 1). Split tubular steel compression limiters 60 are then inserted through the passages 23 to engage the yokes 44 and exert an axial retention force between the communication module 40 and the header portion 20. The force-receiving portion 44a of the yoke 44 primarily receives the retention force exerted by each compression limiter 60.

Figure 10:
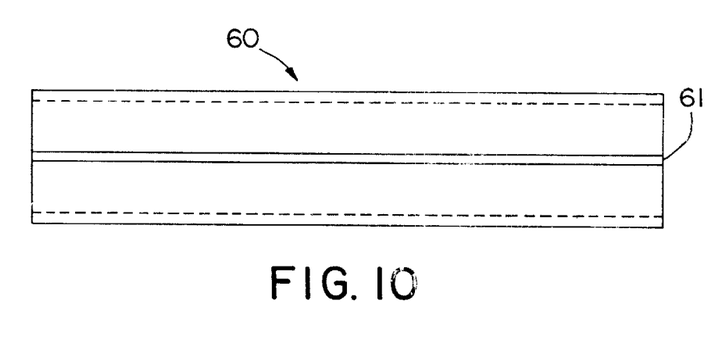
FIG. 10 is a top plan view, partially in phantom, of a compression limiter of the modular base of FIG. 1.
Figure 10A:
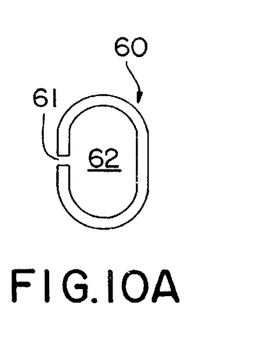
FIG. 10A is a right end plan view of the compression limiter of FIG. 10.

The physical properties of molded plastic brackets require use of metal reinforcements to assure a durable interface between the vehicle and the filter assembly. In particular, the strength of each molded mounting bracket along the passage it defines is insufficient to withstand the compression force exerted by mounting hardware. U.S. patent application Ser. No. 60/183,194, assigned to the assignee of the present invention, describes the use of tubular metal reinforcements to enhance the compressive strength of the molded bracket structures. FIGS. 10 and 10A illustrate a compression limiter 60 configured for use in conjunction with the illustrated preferred embodiments. A slit 61 extends the length of the compression limiter 60. The slit configuration allows the compression limiter 60 to impart a spring flex in a radial direction during installation and exert a radial force against the interior of the passage 23 following installation. The location of the slit 61 may be alternatively positioned at various angular positions relative to the brackets 26 and yokes 44 to obtain an optimum spring force distribution. The compression limiter 60 is aligned within the passage 23 by engagement with ribs 25 extending the length of the passage. Each rib 25 is beveled at the entrance to the passage 23 to facilitate alignment and installation of the compression limiter 60. The compression limiter is retained in the passage by frictional engagement between the ribs 25 and the outside surface of the compression limiter 60. The radially outward force exerted by the slit compression limiter 60 enhances this frictional engagement.

The compression limiter 60 upon installation ha a dual function. The compression limiter 60 serves the necessary function of reinforcing the brackets 26 to withstand compression forces exerted by fasteners used to mount the base to a vehicle. In accordance with the present invention, the compression limiter 60 also provides a secure mechanical engagement between the communication module 40 and the header portion 20. In the preferred embodiment, each compression limiter 60 defines an oval internal passage 62. It will be understood that such an oval passage 62 provides some useful flexibility in the alignment of fasteners (not shown) with openings in the vehicle engine compartment.

The complementary structures of the communication module 40 and header portion 20, when assembled with the sealing grommet 80 and compression limiters 60, provide a fluid sealed base 10 of high structural integrity. The robust mechanical connection provided by the steel compression limiters 60 is extremely consistent and reliable. Since the compression limiters 60, or similar reinforcement was a necessary step in manufacturing a molded plastic filter base, use of the compression limiter to connect the primary components does not add a step to the manufacturing process.

A base of modular design permits alteration of features of a header portion or communication module without requiring an entirely new molded base. Several communication modules can be manufactured to be compatible with a particular header portion, permitting production of bases having different fuel inlet/outlet configurations and with or without a hand primer or heater. The several bases use the same header portion, dramatically increasing the ease and efficiency with which a manufacturer can produce alternatively configured bases to meet changing specifications.

Figure 11:
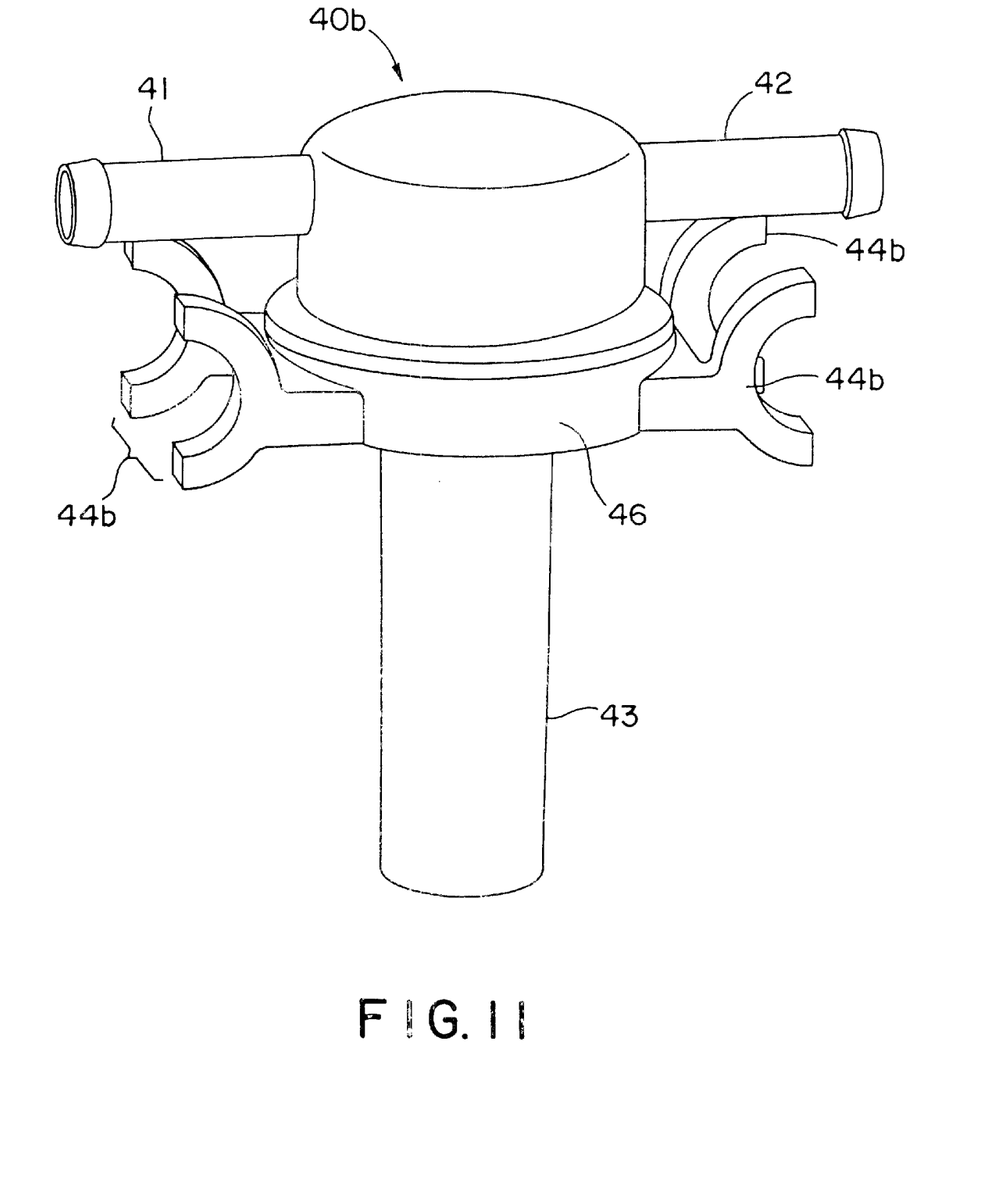
FIG. 11 is a side perspective view of an alternative communication module in accordance with the present invention.
Figure 12:
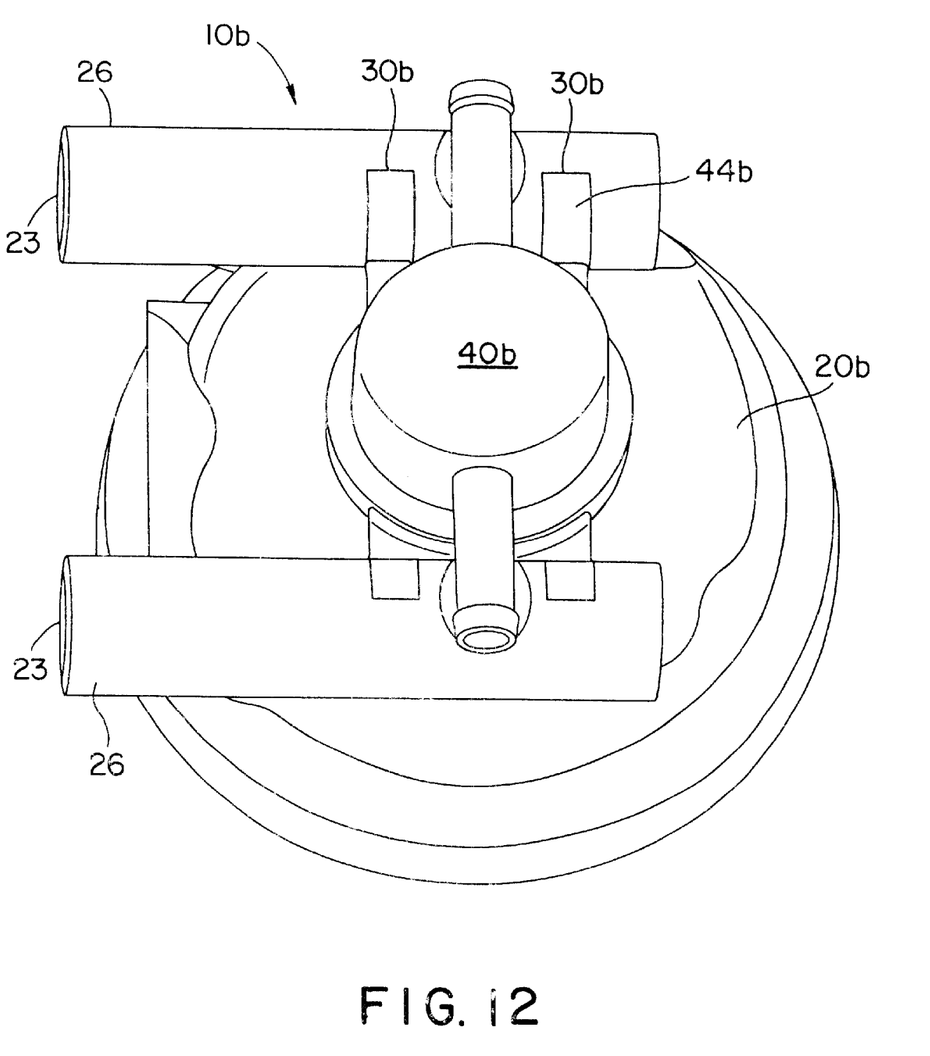
FIG. 12 is a top perspective view of an alternative embodiment of a modular base incorporating the communication module of FIG. 11.

FIGS. 11 and 12 illustrate a second alternative embodiment of filter base 10b. Base 10b includes an alternative communication module 40b that does not include a receptacle for a hand primer. Communication module 40b includes an alternative divided yoke configuration 44b. Header portion 20b includes a complementary divided slot 30b configured to receive the yoke 44b. Together, brackets 26 and yokes 44b define tubular passages 23 for reception of compression limiters to secure the communication module 40b to the header portion 20b as previously described.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed is:

1. A modular base for a filter assembly comprising:
   a header portion configured to receive and retain a filter cartridge, said header portion having an axis and extending from a first end defining a cartridge retainer to a second end including an axial opening and a pair of mounting brackets integrally extending from said header portion;
   a communication module configured to surround and mate with said axial opening and including inlet and outlet connectors, said communication module including a pair of integrally extending yokes; and
   two generally tubular members;
   wherein said mounting brackets and yokes together define a pair of passages, each passage configured to receive one said tubular member, said tubular member being retained in said pathway to fix said communication module to said header portion.

2. The modular base of claim 1, wherein said header portion and communication module are molded plastic units.

3. The modular base of claim 2, wherein said header portion and communication module are molded from glass filled nylon material.

4. The modular base of claim 1, wherein said generally tubular members comprise C-shaped steel compression limiters, each said compression limiter having a lengthwise slit that imparts a radial spring flex to the compression limiter.

5. The modular base of claim 4, wherein each said yoke comprises a force receiving portion, each said bracket comprises a generally tubular sleeve and said compression limiter is compressed within said passage and retained by exerting a radial spring force against said sleeve and said force-receiving portion.

6. The modular base of claim 1, wherein said base comprises a sealing grommet disposed between said header portion and said communication module.

7. The modular base of claim 1, wherein said passages are generally orthogonal to said axis.

8. The modular base of claim 6, wherein said header portion comprises an axially projecting lip coaxial with said axis and said communication module comprises a sealing collar coaxial with said lip and said sealing grommet is radially compressed between said sealing collar and said lip.

9. The modular base of claim 1, wherein said cartridge retainer is integral with said header portion and said cartridge retainer defines a series of angularly spaced retention channels.

10. A method for manufacturing a modular base for a filter assembly, said base comprising a molded header portion configured to receive and retain a filter cartridge, said header portion having an axis and extending from a first end defining a cartridge retainer to a second end including an axial opening and a pair of mounting brackets integrally extending from said header portion, each said mounting bracket including at least one axial slot, a communication module configured to surround said axial opening and including inlet and outlet connectors, said communication module including a pair of integrally extending yokes, each yoke having a configuration complementary to one of said at least one axial slots, and two generally tubular members, said method comprising the steps of:

assembling said communication module and said header portion so that said yokes are received in said at least one axial slots and said mounting brackets and yokes together to define a pair of passages; and inserting one said tubular member in each passage so that said communication module is held in fixed relationship to said header portion by engagement of said tubular member with said bracket and said yoke.

11. The method of claim 10, wherein said header portion comprises an axially projecting lip coaxial with said axis and said communication module comprises a sealing collar coaxial with said lip and said base comprises a sealing grommet, said method further comprising the step of:

installing said sealing grommet around said lip so that said sealing grommet is radially compressed between said lip and said sealing collar during said step of assembling.

12. The method of claim 10, wherein each said tubular member comprises a slit metal tube having a C-shaped configuration and said step of installing comprises:

orienting said slits away from said yokes.

* * * * *